US012177620B2

(12) United States Patent
Pakarinen

(10) Patent No.: US 12,177,620 B2
(45) Date of Patent: Dec. 24, 2024

(54) VOICE CONTROLLED VENTING FOR INSERT HEADPHONES

(71) Applicant: Huawei Technologies Co., Ltd., Guangdong (CN)

(72) Inventor: Jyri Pakarinen, Helsinki (FI)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 251 days.

(21) Appl. No.: 17/756,141

(22) PCT Filed: Nov. 19, 2019

(86) PCT No.: PCT/EP2019/081764
§ 371 (c)(1),
(2) Date: May 18, 2022

(87) PCT Pub. No.: WO2021/098949
PCT Pub. Date: May 27, 2021

(65) Prior Publication Data
US 2022/0417635 A1 Dec. 29, 2022

(51) Int. Cl.
*H04R 1/10* (2006.01)
*H04R 3/00* (2006.01)

(52) U.S. Cl.
CPC ......... *H04R 1/1016* (2013.01); *H04R 1/1083* (2013.01); *H04R 3/00* (2013.01); *H04R 2460/11* (2013.01)

(58) Field of Classification Search
CPC ...... H04R 1/1016; H04R 1/1083; H04R 3/00; H04R 2460/11; H04R 25/505; H04R 25/405; H04R 25/407; H04R 25/604; H04R 25/65; H04R 1/1041; H04R 25/554; H04R 25/558; H04R 2225/025; H04R 2225/41; H04R 2420/07; H04R 25/50; H04R 2201/10; H04R 2225/43
See application file for complete search history.

(56) References Cited

U.S. PATENT DOCUMENTS

| | | | | |
|---|---|---|---|---|
| 6,549,635 | B1 * | 4/2003 | Gebert ................. | H04R 25/652 381/322 |
| 9,654,855 | B2 | 5/2017 | Ring et al. | |
| 9,949,048 | B2 | 4/2018 | Isberg et al. | |
| 2008/0090524 | A1 * | 4/2008 | Lee ....................... | H04W 84/20 455/41.2 |
| 2012/0082335 | A1 | 4/2012 | Duisters et al. | |
| 2014/0093093 | A1 | 4/2014 | Dusan et al. | |
| 2014/0126733 | A1 | 5/2014 | Gauger, Jr. et al. | |

(Continued)

FOREIGN PATENT DOCUMENTS

| | | | |
|---|---|---|---|
| CN | 105245990 | A | 1/2016 |
| CN | 105247885 | | 8/2018 |

(Continued)

*Primary Examiner* — Angelica M McKinney
(74) *Attorney, Agent, or Firm* — WOMBLE BOND DICKINSON (US) LLP

(57) ABSTRACT

An insert headset apparatus utilizes a user generated sound signal such as the user's own voice to control de-occlusion and make the user's own voice sound normal. A voice accelerometer or microphone is used to detect when the user or a nearby person is speaking. When the voice of the user or a nearby person is detected a valve is opened. The valve enables venting of the ear canal, resulting in de-occlusion.

12 Claims, 6 Drawing Sheets

(56) References Cited

U.S. PATENT DOCUMENTS

| | | | | |
|---|---|---|---|---|
| 2014/0169603 | A1* | 6/2014 | Sacha .................. | H04R 25/652 381/324 |
| 2016/0255433 | A1* | 9/2016 | Grinker ................ | H04R 1/1016 381/380 |
| 2018/0091892 | A1* | 3/2018 | Taylor .................. | H04R 1/2826 |
| 2018/0367882 | A1 | 12/2018 | Watts et al. | |
| 2019/0215621 | A1* | 7/2019 | Albahri ................ | H04R 25/405 |

FOREIGN PATENT DOCUMENTS

| | | | | |
|---|---|---|---|---|
| JP | 3081238 | U | 10/2001 | |
| JP | 2015057466 | A | 3/2015 | |
| WO | WO-2012149970 | A1 * | 11/2012 | ........... H04R 25/652 |

* cited by examiner

VOICE CONTROLLED VENTING FOR INSERT HEADPHONES

CROSS-REFERENCE TO RELATED APPLICATIONS

This application is a national stage of International Application No. PCT/EP2019/081764, filed on Nov. 19, 2019, the disclosure of which is hereby incorporated by reference in its entirety.

TECHNICAL FIELD

Embodiments the present disclosure relate generally to insert type headphones and more particularly to reducing occlusion noise effects in insert type headphones.

BACKGROUND

When listening to headphones, a certain amount of sound isolation from the external environment is preferred for an enjoyable listening experience. This isolation can be achieved using insert-type headphones. Insert type headphones, which typically include a left and right headphone device, are headphones where the tip of the headphone device is inserted or pushed into the ear canal. Another benefit of insert-type headphones is that due to the better seal between the ear canal and the surrounding air, low-frequency sounds are more pronounced, leading to a better bass response.

Due to these benefits, insert-type headphones are very popular. However, a drawback of insert-type headphones is that due to occlusion, the voice of the wearer, or other sounds generated by the user, can sound too boomy. Another drawback with insert-type headphones is that the ear canal can sweat and sometimes gets itchy or irritated due to lack of ventilation. In occlusion, the voice of the user transmits naturally to the ear canal via bone-conduction, but the low-frequencies cannot escape the ear canal as the entrance to the ear canal is blocked by the insert-type headphone.

The occlusion effect can be relieved by implementing active noise control in reducing the low frequencies in the ear canal. These methods are generally called de-occlusion techniques. While active noise control may relieve the occlusion effect to a certain extent, it does nothing to help the lack of ventilation and the resulting ear canal sweating. Thus, active noise control is an inferior solution for resolving the problems caused by insert type headsets. Furthermore, in current de-occlusion implementations, the user needs to manually select whether to activate them or not in different situations, which adds to cognitive load and is generally annoying.

Accordingly, it would be desirable to be able to provide an insert-type headphone apparatus that addresses at least some of the problems identified above.

SUMMARY

It is an object of the disclosed embodiments to reduce effects of occlusion with an insert-type headphone apparatus. This object is solved by the subject matter of the independent claims. Further advantageous modifications can be found in the dependent claims.

According to a first aspect the above and further objects and advantages are obtained by an apparatus, such as an insert headset apparatus. In one embodiment, the apparatus has a housing with a first side and a second side. The first side is configured to be inserted into an ear canal of a user or wearer of the insert headset apparatus. A sound sensing device is disposed in the housing. A valve is disposed in the housing and is configured to fluidically connect the first side of the housing to a second side of the housing. A controller is connected to the sound sensing device and the valve. The controller is configured to detect an audio signal from the sound sensing device and open the valve to enable a flow of air between the first side of the housing that is coupled to the ear canal and the second side of the housing that is coupled to the external environment, such as the surrounding air. The aspects of the disclosed embodiments reduce the effects of occlusion in an insert-type headset apparatus by using an audio signal, such as the user's own voice, to control the opening of a valve. The valve enables pressure release, air flow and venting between the ear canal and the surrounding environment.

In an embodiment, the controller is configured to detect the audio signal by one or more of detecting a user generated sound, a non-user generated sound or detecting a background noise level that is lower than a predetermined noise level. The valve can be programmed to open when sounds are detected that can be perceived as disturbing when wearing insert headsets or headphones.

In an embodiment, the user generated sound is a speech signal generated by the user of the headset apparatus and is sensed by the sound sensing device. The valve can be programmed to open when the user is speaking, which might otherwise be perceived as disturbing when wearing insert-type headsets or earbuds.

In an embodiment, a channel in the housing is connected to the valve. The channel is configured to fluidly connect the first side of the housing that is coupled to the ear canal, with the second side of the housing that is coupled to the external environment, when the valve is in an open state. The aspects of the disclosed embodiments reduce the effects of occlusion in an insert-type headset apparatus by using the user's own voice to control the opening of a valve to enable pressure release and allow venting or air flow between the ear canal and the external environment or surrounding air.

In an embodiment, the controller is further configured to determine a delivery of a content signal to the insert headset apparatus, detect the audio signal from the sound sensing device, pause the delivery of the content signal, open the valve for a predetermined period of time, and resume the delivery of the content signal upon an expiration of the predetermined period of time. The aspects of the disclosed embodiments reduce the effects of occlusion in an insert-type headset apparatus by opening a valve to enable pressure release and allow air flow between the ear canal and the external environment or surrounding air when a user generated noise is detected. The delivery of content to the ears of the user can be paused while the other sounds, or effects of the other sounds, are vented.

In an embodiment, the controller is further configured to detect a pause in a delivery of a content signal to the insert headset apparatus, determine an expiration of a predetermined time period from the pause in the delivery of the content signal and if the delivery of the content signal has not resumed by the expiration of the predetermined time period, open the valve. The aspects of the disclosed embodiments enable venting when the insert headset apparatus remains inserted in ear and there is no active call or other program material being delivered to the ear tips. This can keep the ear canal cooler and not sweaty.

In an embodiment, the controller is configured to open the valve when it is detected that a background noise level is less than a predetermined threshold value and that the user is not listening to program material. This allows venting of the ear canal in the situation where the insert headset is in a use position but is not currently being used for listening or to passively block environmental noise. Allowing this venting to occur when the background noise level is below a predetermined threshold can reduce discomfort in the ear canal that might otherwise resulting from sweating due to blocking insert headsets.

In an embodiment, the controller is configured to detect that the background noise level exceeds the predetermined noise level and maintain the valve in a closed state. The aspects of the disclosed embodiments can detect wind or other noise conditions and avoid opening the valve during such conditions, which might otherwise cause further disturbances that can be perceived negatively.

In an embodiment, the sound sensing device is one or more of a voice accelerometer or a microphone. The aspects of the disclosed embodiments can use a voice accelerometer of a microphone to detect for example when the user or a nearby person is speaking and open the valve accordingly.

In an embodiment, the housing comprises an ear bud. An ear bud is an exemplary implementation of an insert type headset apparatus. The aspects of the disclosed embodiments reduce the effects of occlusion from the use of an ear bud by controlling the opening of a valve to enable pressure release allow air flow between the ear canal and the surrounding environment when user generated sounds are detected.

According to a second aspect the above and further objects and advantages are obtained by a method. In one embodiment, the method includes detecting an audio signal by a sound sensing device of an insert headset apparatus and opening a valve of the insert headset apparatus. The opening of the valve enables pressure release and air flow by connecting one side of the insert headset apparatus that is coupled to the user's ear canal, with another side of the insert headset apparatus that is coupled to an external environment or the surrounding air. The aspects of the disclosed embodiments reduce the effects of occlusion in an insert-type headset apparatus by controlling the opening of a valve based on the detection of a user generated sound or noise.

In an embodiment, the method further comprises determining whether the audio signal is one or more of a user generated sound, a non-user generated sound or a background noise signal. The aspects of the disclosed embodiments are configured to detecting a user, or nearby person, generated audio or sound signal that may cause occlusion effects or might otherwise be perceived as disturbing when using an insert headset apparatus. A valve is controlled to open when such sounds are detected.

In an embodiment, the method includes detecting that the user generated sound is a speech signal generated by the user of the insert headset apparatus. The valve can be programmed to open when user is talking and wearing the insert headsets.

In an embodiment, the method further includes determining a delivery of a content signal to the insert headset apparatus, detecting the audio signal, pausing the delivery of the content signal, opening the valve for a predetermined period of time, determining an expiration of the predetermined period of time and resuming the delivery of program material. The aspects of the disclosed embodiments reduce the effects of occlusion in an insert-type headset apparatus by controlling the opening of a valve. When certain sounds or noises are detected that may generate occlusion effects the valve is opened. The delivery of content to the ears of the user can be paused while the valve is open to minimize the interference with the material being listened.

In an embodiment, the method further includes detecting a pause in a delivery of a content signal to the insert headset apparatus, determining an expiration of a predetermined time period from the detected pause in the delivery of the content signal; and opening the valve if the delivery of the content signal has not resumed by the expiration of the predetermined time period. The aspects of the disclosed embodiments enable venting when the insert headset apparatus remains inserted in ear and there is no active call or other program material being delivered to the ear tips. This can keep the ear canal cooler and not sweaty.

In an embodiment, the controller is configured to open the valve when it is detected that a background noise level is less than a predetermined threshold value and that the user is not listening to program material. This allows venting of the ear canal in the situation where the insert headset is in a use position but is not currently be used for listening or passive attenuation of surrounding noise. Allowing this venting to occur when the background noise level is below a predetermined threshold can reduce discomfort in the ear canal that might otherwise resulting from sweating due to blocking insert headsets.

In an embodiment, the method includes detecting that a background noise level exceeds a predetermined noise level and maintaining the valve in a closed state. The aspects of the disclosed embodiments can detect wind or other noise conditions and avoid opening the valve. Opening the valve in windy or noisy conditions might otherwise cause further disturbances and be perceived negatively.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention can be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

Figure 1:
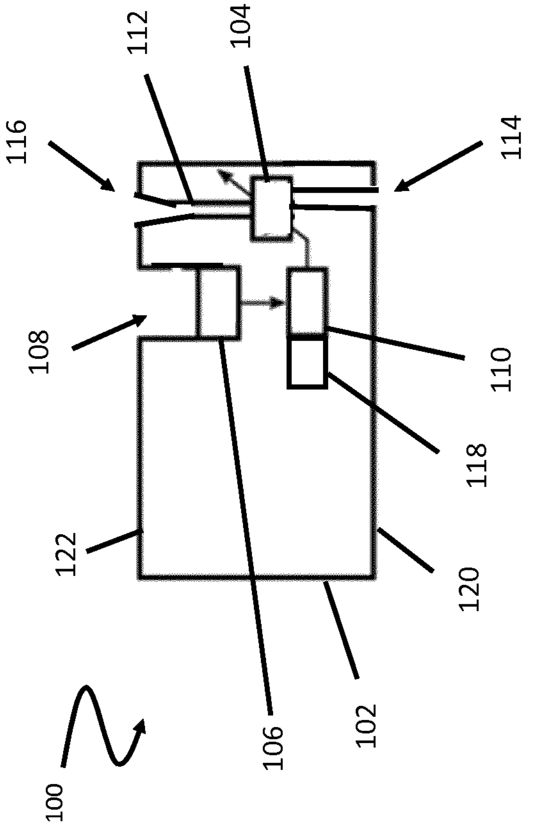
FIG. 1 illustrates a schematic block diagram of an exemplary apparatus incorporating aspects of the disclosed embodiments.

Referring to FIG. 1, a schematic block diagram of an exemplary apparatus 100 incorporating aspects of the disclosed embodiments is illustrated. The aspects of the disclosed embodiments are directed to reducing the effects of occlusion in an insert-type headphone apparatus 100. An audio signal, such as the voice of the user, can be used to control the opening of a valve 104, which enables a pressure release and a flow of air between the ear canal of the user or wearer of the insert-type headphone apparatus and an external environment, such as the surrounding air. This pressure release can reduce effects of occlusion, which can be otherwise be perceived negatively by a wearer of the apparatus 100.

As is illustrated in FIG. 1, the exemplary insert-type headphone apparatus 100 includes a housing 102. For purposes of the description herein, the insert-type headphone apparatus 100 will be referred to as an insert headset apparatus or earbud. The housing 102 has a first side or portion 120 and a second side or portion 122. The terms "first side" and "second side" as used herein are relative terms, as a shape of the housing 102 can be any suitable geometric shape that might be used with an insert-type headphone, or ear bud, as these devices are commonly referred to.

The first side 120 of the housing 102 is configured to be inserted into or otherwise disposed in an ear canal of a user. This first side 120 can typically include an ear implant or cushion that is inserted into the ear canal and can include a speaker for producing sound that the user can listen to. The second side 122 of the housing 102 defines a cavity 108 which includes a sound or audio sensing device 106, generally referred to herein as sound sensing device 106. The sound sensing device 106 is configured to receive and sense sound signals, also referred to as audio signals, as is generally understood.

The typical insert-type headphones can include a left insert headset apparatus and a right insert headset apparatus, which can also be referred to as a left earphone device and a right earphone device. For the purposes of the description herein, only one insert headset apparatus 100 is referred to, and the insert headset apparatus 100 of the disclosed embodiment can comprise one or both of the left insert headset apparatus and the right insert headset apparatus, and can include wired and wireless devices.

Although the sound sensing device 106 is described herein with respect to a cavity 108, the aspects of the disclosed embodiments are not so limited. In alternate embodiments, the sound sensing device 106 can be disposed in or at any suitable location with respect to the housing 102 and does not need to be disposed in a cavity. In one embodiment, the sound sensing device 106 could be attached to, or part of, a wire loop that is attached to the insert headset apparatus 100. For example, in wired insert headphone devices, a wire cable connected to the earphones can include a microphone assembly, which can comprise or include the sound sensing device 106.

In one embodiment, a valve 104 is disposed in the housing 102. The valve 104 is configured to connect the first side 120 of the housing 102 to the surrounding air, also referred to herein as the external environment, on the second side 122 of the housing. When the valve 104 is in an open state, any pressure built up on side of the valve 104 can be released and the flow of air between the first side 120 of the housing 102 and the second side 122 of the housing 102 is enabled.

The valve 104 can be any suitable type of valve, such as an active or electronically controlled valve. For example, in one embodiment, an electrically-controlled active valve can be implemented using a miniaturized solenoid valve. The valve 104 can be controlled between an open and a closed state.

In one embodiment, the apparatus 100 also includes a controller 110. The controller 110 is generally connected to one or more of the sound sensing device 106 and the valve 104. The controller 110 is configured to receive signals from the sound sensing device 106 and control or switch the valve 104 between an open state and a closed state, depending on the received signal(s).

In one embodiment, the controller 110 is configured to detect an audio signal and control the state of the valve 104 depending upon the detected audio signal. In accordance with the aspects of the disclosed embodiments, the audio signal is a signal that is sensed or detected by the sound sensing device 106. The signal from the sound sensing device 106 is delivered to the controller 110. In one embodiment, the controller 110 is configured to determine that the audio signal is one or more of a sound or audio signal generated by the user, or a noise or other signal from the surrounding environment external to the user.

The audio signal generated by the user can include, but is not limited to one or more of speech, an utterance, a chewing sound, an eating sound, a cough or sneeze, footsteps of the user or some other noise that can generate occlusion effects when the user is wearing the insert headset apparatus 100. These type of sounds can typically generate a booming effect when the user is wearing earbud type devices. The audio signal can also include external noises such as wind or other environmental noise.

In one embodiment, the detected audio signal can also comprise the speech of a nearby person. For example, when the user is wearing the insert headset apparatus 100, with ear buds inserted into one or both ears, it can be difficult to hear surrounding noises, such as if another person is speaking. In some cases, as is further referenced herein, a user may use the insert headset apparatus for passive blocking or attenuation of surrounding or environmental noise. In these situations, the user may still want to be able hear someone who is speaking nearby.

In this example, the controller 110 can be configured to detect the speech of a nearby speaker and open the valve 104 accordingly. In one embodiment, the sound sensing device 106 can comprise a voice accelerometer. The voice accelerometer can be used to detect and differentiate the user's speech from someone else speaking nearby. For example, when the user is speaking, the voice accelerometer can vibrate considerably more or with a higher intensity, than the vibrations cause by a nearby speaker. In one embodiment, the speech of a nearby speaker can be detected based on the vibration intensity of the voice accelerometer being at or below a predetermined threshold value and the valve opened. In alternate embodiments, any suitable sound sensing device other than including a voice accelerometer can be used to detect a nearby person or persons speaking. The term "nearby" can include any suitable or desired range, such as between 1 meter and 10 meters, or less than 10 to 15 meters, for example. In some cases, the range might be less than 5 meters, for example. In one embodiment, the range can be selectively set. Opening the valve 104 in this situation can enable the user to hear nearby discussions with less difficulty.

In one embodiment, the controller 110 generally comprises a processor and memory. The processor is generally configured to execute non-transitory machine readable instructions, which when executed, are configured to carry out one or more of the processes described herein. The controller 110 is configured to enable the processor to control the operation of the valve 104 and switch the state of the valve 104 between the open and closed positions or states, depending on the detection of the audio signal.

In the example of FIG. 1, the controller 110 can also include one or more timers, referred to herein as timer 118. The timer 118 is generally configured to count or monitor time periods. For example, in one embodiment, the timer 118 can be used to determine a length of time the valve 104 is open or closed. In an alternate embodiment, the timer 118 is configured to monitor a duration of a detected sound or audio signal. Although the timer 118 is shown in FIG. 1 to be a separate device, the aspects of the disclosed embodiments are not so limited. In alternate embodiments, the timer 118 can be part of the controller 110 and comprise any suitable type of timing or clock device.

The aspects of the disclosed embodiments are directed to utilizing detection of a user generated sound(s) to control the opening of the valve 104 and eliminate or reduce the effects of occlusion. When the valve 104 opens, pressure can be released and a flow of air enable between the ear canal, on the first side 120 of the housing 102, and the environment external to the ear canal, on the second side 122 of the housing 102. While a flow of air is generally referred to herein, the aspects of the disclosed embodiments are not so limited. The opening of the valve 104 can also enable sound waves to travel to and between the first side 120 and the second side 122.

For the purposes of the description herein, the opening of the valve 104 can also be referred to as "venting." By opening the valve 104 when an audio signal, such as the user's speech is detected, rather than hearing a booming sound, which is a more typical occlusion effect, the venting disclosed herein allows the user's voice to sound more normal. Thus, for example, if the user says something while the insert headset apparatus 100 is disposed in the user's ear, the controller 110 can react and open the valve 104 to switch on the de-occlusion. Similarly, if the user generates some other sound or sounds, such as for example, while chewing, eating, coughing, sneezing or walking while the insert headset apparatus 100 is disposed in the user's ear, the controller 110 can react to this type of user generated audio or noise signal and open the valve 104. The detected sound in the form of an audio signal can comprise any type of sound or noise that might be perceived as disturbing when wearing insert-type headsets. The de-occlusion or venting of the disclosed embodiments eliminates or reduces the booming effect that might otherwise be heard by the wearer of the insert headset apparatus 100.

The sound sensing device 106 can be any suitable sound or voice sensing device that can be used to detect a voice or other audio signal as is generally described herein. For example, in one embodiment, the sound sensing device 106 is a voice accelerometer that senses when the user is speaking or generates some other audible sound or noise. When the sound sensing device 106 senses that the user has generated some audible sound, the controller 110 is configured to cause the valve 104 to open. This allows pressure relief and the flow of air or sound within the channel 112. Although the sound sensing device 106 and controller 110 are shown in FIG. 1 as separate devices, the aspects of the disclosed embodiments are not so limited. In one embodiment, the sound sensing device 106 and the controller 110 can comprise a single device.

In one embodiment, the valve 104 can be programmed or controlled by the controller 110 to open when a background noise level detected by the sound sensing device 106 is lower than a certain or predetermined threshold value. For example, if the user is wearing the insert headset apparatus, but not listening to any content or program material, it may be desirable to open the valve to vent the ear canal. The aspects of the disclosed embodiments allow venting of the ear canal in the situation where the headset is on but is not currently be used for listening or passive attenuation of surrounding sounds or noise. Allowing this venting to occur when the background noise level is below a predetermined threshold can reduce discomfort in the ear canal that might otherwise resulting from sweating due to blocking insert headsets.

In the example of FIG. 1, an air channel 112 is disposed within the housing 102. The air channel 112 can comprise any suitable ventilation or flow path that enable the flow of air and/or sound between the first side 120 and the second side 122. The air channel 112 of FIG. 1 includes a first end or opening 114 and a second end or opening 116. The valve 104 couples or connects the first end 114 of the channel 112 and the second end 116 of the channel 112. The first end 114 is in communication with the ear canal of the user (not shown in the Figure), while the second end 116 is in communication with the external environment, such as the surrounding air outside of the insert headset apparatus 100. An example of this is also illustrated with respect to FIG. 2, described below.

Although only one channel 112 and valve 104 are illustrated in FIG. 1, the aspects of the disclosed embodiments are not so limited. In alternate embodiments, the housing 102 can include any number of channels 102 and valves 104 that enable air flow to and between the first side 120 and the second side 122 of the housing 102 as is generally described herein. For example, in one embodiment, it may be desirable to include more than one, or different flow paths or channels on different sides or portions of the insert headset apparatus 100. In other embodiments, it may be desirable to have one or more combinations of multiple openings 114, 116 with one or more channels 112, to enhance the venting and de-occlusion effects. For example, the one or more openings 114, 116 could be distributed about the surfaces of the respective sides 120, 122 of the housing 102 in different places to provide a more inflow and outflow distribution, rather than just a single location. A single valve 104 can be connected between the one or more openings 114, 116 as is described herein.

In the example of FIG. 1, the valve 104 is disposed within an approximate midpoint of the channel 112. In alternate embodiments, the valve 104 can be disposed at any suitable location with respect to the channel 112. For example, in one embodiment, the valve can be disposed at or closer to the first end 114 or the second end 116. The aspects of the disclosed embodiments are not intended to be limited by a position of the valve 104 with respect to the housing 102 and channel 112.

Figure 2:
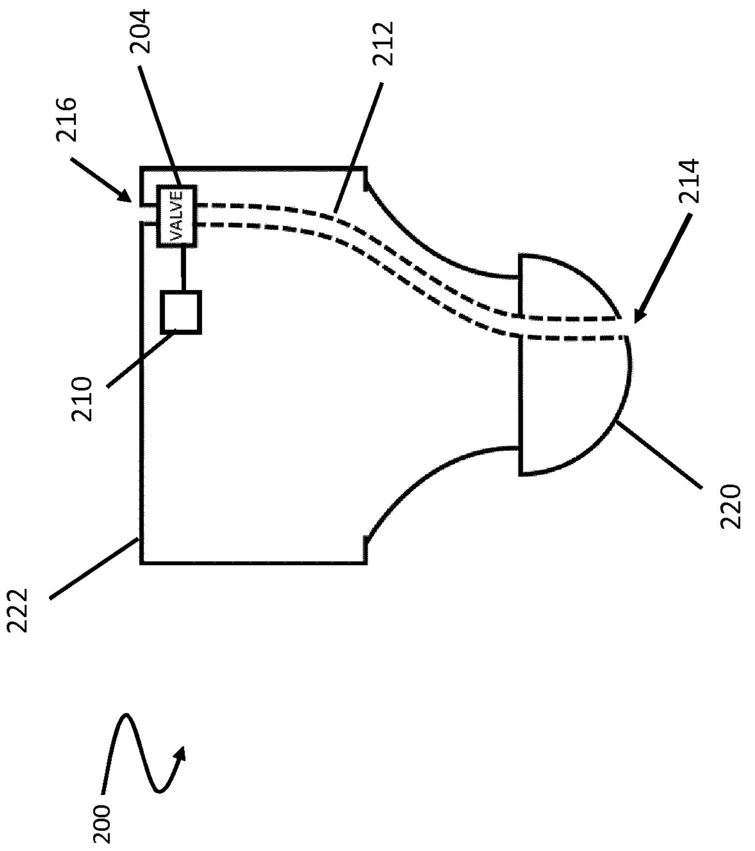
FIG. 2 illustrates a schematic cross-sectional view of an exemplary apparatus incorporating aspects of the disclosed embodiments.

Referring to FIG. 2, an implementation of an exemplary insert-type headset apparatus 200 incorporating aspects of the disclosed embodiments is illustrated. In this example, the insert headphone apparatus 200 comprises an earbud device, which may also be referred to as an ear tip or headphone device. As was described above, a typical insert-type headphone can include two such earbuds, one for the left ear and another for the right ear.

In the example of FIG. 2, the first side 220 of the apparatus 200 comprises an ear tip. The ear tip 220 is configured to be inserted into, or disposed in relation to, the ear canal of the user or wearer. The ear tip 220 can generally include a speaker or other sound generating device. When the valve 204 is closed, there is no airflow in the channel 212. When the valve 204 is open, the flow of air between the opening 214 on the first side or ear tip 220 and the opening 116 on the second side 222 is enabled. The opening of the valve 204 and corresponding pressure release can enable the flow of air to and between opening 214 and opening 216 results in less occlusion effects and improved ventilation of the ear canal region.

Although not shown in the example of FIG. 2, the insert headset apparatus 200 can include a sound sensing device 106 or other sound sensing device, as is described with respect to FIG. 1. In one embodiment, the sound sensing device 106 can be a component of one or more of the valve 204 or the controller 210, with corresponding reference to the valve 104 and controller 110 of FIG. 1. In alternate embodiments, the sound sensing device 106 can be disposed at or in any suitable location of the apparatus 200 in a manner that allows the sound sensing device to detect user generated noise or background noise, as is described herein.

Figure 3:
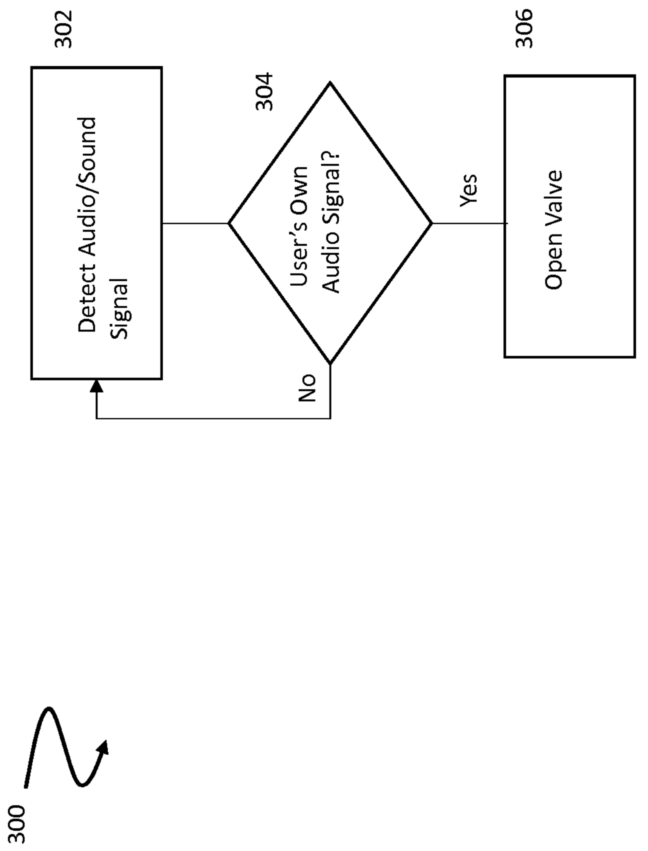
FIG. 3 is a flowchart illustrating aspects of an exemplary method incorporating aspects of the disclosed embodiments.

FIG. 3 illustrates an exemplary process flow 300 incorporating aspects of the disclosed embodiments. In this example, a signal from the sound sensing device 106 is detected 302. The signal can be or represent any suitable sound or audio signal, such as a user generated sound signal, a speech signal from a nearby user, or a background noise signal, as is otherwise described herein. It is determined 304 if the signal is a user generated noise signal. If it is, the valve is opened 306.

Figure 4:
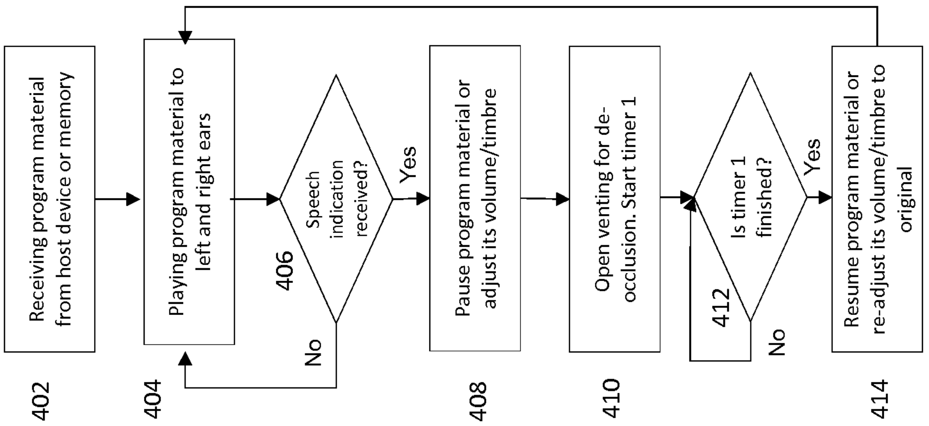
FIG. 4 is a flowchart illustrating aspects of an exemplary method incorporating aspects of the disclosed embodiments.

In the example of FIG. 4, the process 400 illustrates the case where the user is listening to or otherwise receiving 402 a content signal or program material which is played 404 or otherwise output into the user's ears with the insert headset apparatus. The term content signal or program material is generally used herein to refer to audio that is delivered to the user's ears via the ear tips of the insert headset apparatus. For example, the user might be on a phone call, listening to music or speech. If the user talks or generates other user based sounds as generally described herein, while listening to such content, a corresponding speech indication signal is detected or received 406 by the controller. In one embodiment, the delivery of the content signal can be paused or halted 408. In one embodiment, this could include adjusting the volume of the delivered content signal down. For example, the user may be listening to music and then engage in a dialogue. The volume can be turned down and play in the background. In this manner the content is still being played, but at lower or quieter level, in order to not to disturb the dialogue. Alternatively, the timbre of the music or other content signal could be adjusted to, for example, remove content mainly from a speech frequency range.

The valve 104 is then opened 410 for de-occlusion. The opening of the valve 104 and the corresponding venting is used for lowering the excessive bass content of the user's speech that leads to the occlusion effect, e.g. a perceived boomy voice sound.

In one embodiment, when the valve 104 is opened, a timer, such as the timer 118 of FIG. 1, is activated 410. It is determined 412 whether a pre-determined time period has expired. The pre-determined time period is configured to generally correspond to a duration of a typical user utterance or other user generated sound. In one embodiment, the exact time of an exemplary utterance can be experimentally discovered during a tuning phase of the apparatus 100. In such an embodiment, the apparatus 100, or the controller 110, can be configured so that the timer 118 can be adjusted or the pre-determined time can be set in the timer 118. In alternate embodiments, the pre-determined time period can be any suitable or desired duration.

If the pre-determined time period has expired 412, the delivery of the content signal is resumed 414. This means that the program material is delivered to the user's ears from the insert headset apparatus 100. The valve, such as valve 104 or 204, can also be closed at this time. In one embodiment, the valve is closed and the volume at which the program material is delivered is adjusted back to the level it was set at prior to the opening of the valve.

Figure 5:
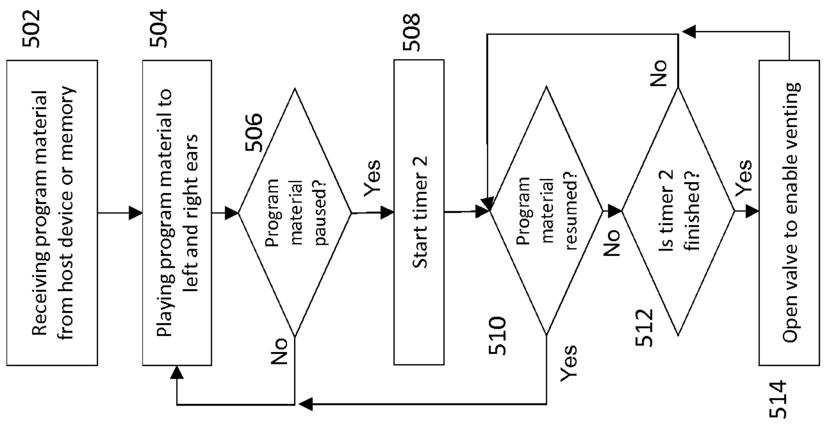
FIG. 5 is a flowchart illustrating aspects of an exemplary method incorporating aspects of the disclosed embodiments.

Referring to FIG. 5, in this example, the delivery of the content signal to the insert headset apparatus 110 is paused. However, user leaves the insert headset apparatus 100 in place, in one or more of their ears. For example, when the user is on a call, the call may end, but the ear buds are left in one or both ears. As another example, the music may finish, but the ear buds are still in the ears. In this case, the ventilation according to the aspects of the disclosed embodiments should be enabled after a certain time period has expired in order to prevent the ear canal from sweating, which could lead to discomfort.

In the example of FIG. 5, it is determined 502 that the content signal is being received 504 in one or both of the ear buds of the insert-type headset apparatus. It is determined 506 whether delivery of the content signal is paused or otherwise interrupted. If yes, a timer, such as timer 118, is started 508. The timer can comprise the timer 118 referred to in FIG. 1, or a different timer. In one embodiment, the timer 118 of FIG. 1 can include multiple clocks or timing modules. Thus, multiple time periods can be monitored.

It is determined if the delivery of content signal is resumed 510. If no, it is determined 512 as to whether a pre-determined time has expired. In one embodiment, the pre-determined time is a time that is pre-set in the timer. This pre-determined time can be determined for example by, discovery during an algorithm tuning or set-up phase of the insert-type headset apparatus. In alternate embodiments, the pre-determined time period can be any suitable or desired time period.

If the pre-determined time has expired, the valve is activated or opened to enable venting. The venting can allow air to pass between the ear canal and the external environment—or the surrounding air outside of the ear canal. This can help with the prevention of sweat build-up or other discomfort that might otherwise arise when ear bud type devices are left inserted in an ear.

Figure 6:
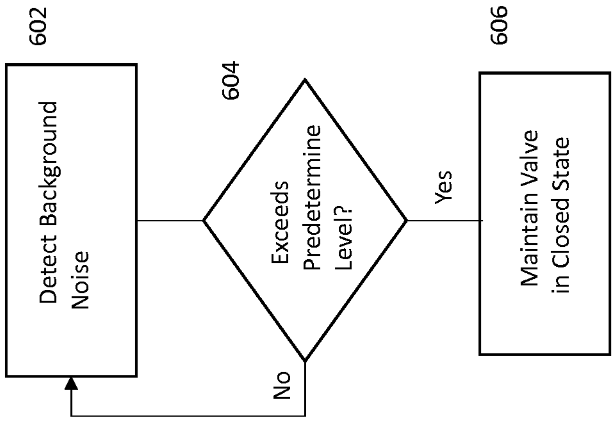
FIG. 6 is a flowchart illustrating aspects of an exemplary method incorporating aspects of the disclosed embodiments.

While the aspects of the disclosed embodiments open the valve 104 in certain situations to enable ventilation, there may be conditions where it is not desirable to open the valve 104. For example, where the background noise exceeds a certain level, it may not be desirable to open the valve 104, as that could enable more noise or sound to travel to the ear canal. As illustrated in FIG. 6, in one embodiment, the method can also include determining or detecting the background noise level 602. It is determined 604 if the background noise level exceeds a pre-determined level. If the background noise level exceeds the pre-determined level, the valve, such as valve 104, 204 is not opened, is closed, or is otherwise maintained in the closed state.

The determining of the background noise as illustrated in FIG. 6 can occur at any point in the processes referred to in FIGS. 3-5. For example, in one embodiment, when the processes of FIGS. 3-5 determine that the valve 104 is to be opened for venting, the background noise level can be checked to determine if it is suitable for the valve to be opened. Alternatively, this background noise check can be run at any point during the process, or while the valve 104 is in the open state.

In one embodiment, detecting the background noise signal can only be applied if program material is not played, or a content signal is not detected. For example, the user can have the headset or earbuds on, but content is not being delivered to the earbuds. In this way, the apparatus 100 does not analyze the background noise level while program material is being played, thus saving battery life.

To determine a suitable background noise level, in one embodiment, the tuning phase of the insert-type headset apparatus can include an additional control for checking the background noise level to avoid opening valve 104. The aspects of the disclosed embodiments can provide this additional check to prevent activating the ventilation described herein in a noisy environment, which noise could be perceived negatively by the user.

The aspects of the disclosed embodiments allow the user to experience his/her own natural voice even when wearing insert headsets, without needing to press any buttons or navigate any menus in order to reduce occlusion effects. Using an actual valve instead of active noise control requires less power and typically allows better sound quality. Also, the aspects of the disclosed embodiments ensure that enough ear canal ventilation takes place, unlike with existing headsets, which can lead to increased wearing comfort. This benefit comes from the actual venting provided, rather than active noise control.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An insert headset apparatus comprising:
- a housing having a first side and a second side, the first side being configured to be inserted into an ear canal;
- a sound sensing device disposed in the housing;
- a valve disposed in the housing, the valve configured to fluidically connect the first side of the housing to the second side of the housing; and
- a controller connected to the sound sensing device, the controller configured to:
  - detect an audio signal from the sound sensing device;
  - pause a delivery of a content signal;
  - open the valve to cause a flow of air between the first side and the second side of the housing; and to perform at least one of
    - determining the delivery of the content signal to the insert headset apparatus;
    - detecting the audio signal; and
    - resuming the delivery of the content signal upon a first expiration of a predetermined period of time; or
    - detecting a pause in the delivery of the content signal to the insert headset apparatus;
    - determining a second expiration of a predetermined time period from the pause in the delivery of the content signal; and
    - opening the valve when the delivery of the content signal has not resumed by the second expiration of the predetermined time period.

2. The insert headset apparatus according to claim 1, wherein the controller is configured to detect the audio signal by one or more of:
- detecting a user generated sound signal;
- detecting a non-user generated sound signal; or
- detecting a background noise level that is lower than a predetermined noise level.

3. The insert headset apparatus according to claim 2, wherein the user generated sound signal is a speech signal generated by a user of the insert headset apparatus and is sensed by the sound sensing device.

4. The insert headset apparatus according to claim 2, wherein the controller is configured to maintain the valve in a closed state when it is detected that the background noise level exceeds the predetermined noise level.

5. The insert headset apparatus according to claim 1, further comprising:
- a channel in the housing, the channel being connected to the valve and configured to connect the first side and the second side when the valve is in an open state.

6. The insert headset apparatus according to claim 1, wherein the sound sensing device comprises one or more of a voice accelerometer or a microphone.

7. The insert headset apparatus according to claim 1, wherein the housing comprises an ear bud.

8. A method applied to an insert headset apparatus, the method comprising:
- detecting an audio signal with a sound sensing device of the insert headset apparatus;
- pausing a delivery of a content signal;
- opening a valve of the insert headset apparatus, wherein the opening of the valve causes a flow of air between a first side of a housing of the insert headset apparatus and a second side of the insert headset apparatus;
- determining the delivery of the content signal to the insert headset apparatus;
- detecting the audio signal;
- opening the valve for a predetermined period of time after pausing the delivery of the content signal;
- determining an expiration of the predetermined period of time; and
- resuming the delivery of the content signal.

9. The method according to claim 8, wherein the opening of the valve is further causes a pressure release and an air flow from the first side of the housing coupled to an ear canal of a wearer and the second side of the housing coupled to an environment external to the ear canal.

10. The method according to claim 8, further comprising determining whether the audio signal is one or more of a user generated signal, a non-user generated signal or a background noise signal.

11. The method according to claim 8, further comprising:

detecting that a background noise level exceeds a predetermined noise level; and maintaining the valve in a closed state.

12. A method applied to an insert headset apparatus, the method comprising:

detecting an audio signal with a sound sensing device of the insert headset apparatus;

pausing a delivery of a content signal;

opening a valve of the insert headset apparatus, wherein the opening of the valve causes a flow of air between a first side of a housing of the insert headset apparatus and a second side of the insert headset apparatus;

detecting a pause in the delivery of the content signal to the insert headset apparatus;

determining an expiration of a predetermined time period; and opening the valve if the delivery of the content signal has not resumed by the expiration of the predetermined time period.

* * * * *